Figure 1:
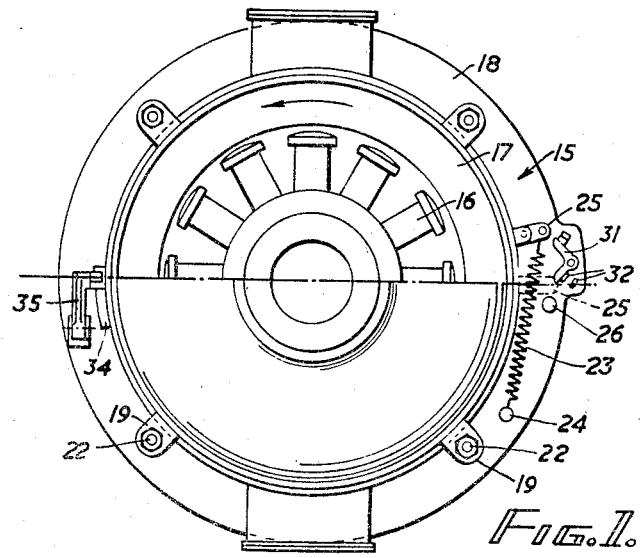

July 1, 1958

H. E. C. CLAPHAM 2,841,725

ELECTRIC GENERATING EQUIPMENT

Filed May 4, 1956

INVENTOR
HAROLD E. C. CLAPHAM

BY Watson, Cole, Grindle &
Watson ATTORNEY

United States Patent Office 2,841,725
Patented July 1, 1958

2,841,725

ELECTRIC GENERATING EQUIPMENT

Harold Edward Cameron Clapham, Edinburgh, Scotland, assignor to Bruce Peebles & Company Limited, Edinburgh, Scotland, a British company Application May 4, 1956, Serial No. 582,753

8 Claims. (Cl. 310—112)

This invention relates to electric generating equipment including a main generator, and is particularly concerned with the operation of under-speed and/or over-speed alarm or control mechanism dependent on the speed of the main generator.

The usual practice is to couple directly to the non-driven end of the main generator shaft the necessary centrifugal device to operate the under-speed and over-speed switches required for the operation or protection of the generating plant.

In some cases no shaft end is available for the mounting of this device, for example in a vertical shaft generator coupled to a hydraulic turbine of the "Kaplan" type where the non-driven end of the generator shaft has to accommodate the gear required to actuate the turbine blades. Cases can arise where for various other reasons it is not desired to mount the under and over-speed trips on the end of the generator shaft. In these circumstances it is then usually necessary to mount this trip gear somewhere between the ends of the shaft of the generating unit. Usually the shaft is of large diameter which in turn necessitates the trip gear being of large dimensions, and also the shaft may have to be lengthened to accommodate the trip mechanism. Thus the provision of trip gear in these circumstances is somewhat inconvenient.

An object of the present invention is to overcome these difficulties.

According to the present invention electric generating mechanism including a main generator having a rotor on a main shaft, and an auxiliary generator having a rotor carried or constituted by the same shaft is characterized in that the stator of the auxiliary generator is mounted to move about the axis of the shaft due to the load torque on the auxiliary generator, and that such movement is opposed by restraining means and is arranged to operate over and/or under-speed control or alarm mechanism.

Conveniently the auxiliary generator has a permanent magnet field. The auxiliary generator may be mounted between the ends of the shaft of the main generator and may surround this shaft.

It is not uncommon for electric generators to be fitted with small auxiliary generators, for example generators driven by hydraulic turbines are frequently fitted with permanent magnet auxiliary generators to supply power to governor motors or other devices necessary for the operation of the plant. Where these auxiliary generators cannot be coupled to the end of the main shaft they must perforce be built round the main shaft, as would be the case where the generator is driven by a "Kaplan" turbine. In carrying the invention into effect a single auxiliary generator may perform both functions, namely providing an electrical output to supply a governor motor or the like, as well as a mechanical torque to operate under-speed or over-speed devices.

In one arrangement the auxiliary generator is electrically connected to a dummy load which is carried mechanically by and moves with its armature. The power requirements of governor motors and other devices usually fed from such permanent magnet auxiliary generators are usually too small and too variable to provide satisfactory torque for angular displacement of the stator. It will therefore be desirable to provide an additional load, such as a dummy resistance load, for the auxiliary generator and if this is carried by the stator of this generator, for example incorporated in the actual stator winding, flexible cables are unnecessary or will only have to carry the small current required for operating the governor motors. Moreover if such flexible connectors should be damaged the main torque will be unaffected so that the overspeed trip will still operate. The auxiliary generator may carry two separate armature windings, one connected to the dummy load for producing the main torque for stator movement and one to feed the governor motor or other auxiliary equipment. The former may be a short-circuited winding of appropriate resistance.

Figure 2:
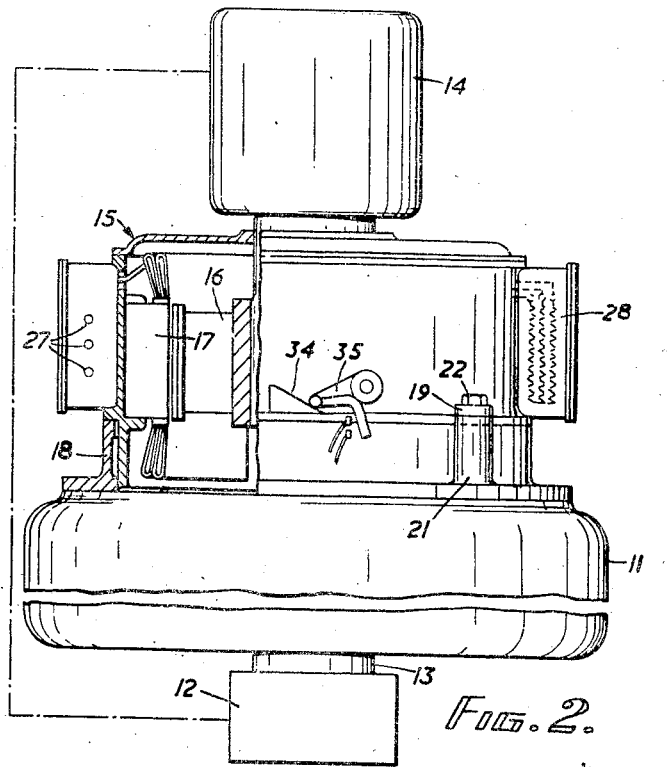

The invention may be carried into practice in different ways but one specific embodiment as applied to a main generator driven by a Kaplan turbine will be described by way of example with reference to the accompanying drawings of which:

Figure 1 is a plan view of the auxiliary generator with half the end shield removed and, Figure 2 is a part sectional elevation of the auxiliary generator shown in Figure 1 with other parts of the generating equipment shown diagrammatically.

The main generator 11 is driven by a Kaplan turbine 12 mounted on one end of its vertical shaft 13, while on the other end of the shaft is mounted mechanism 14 for adjusting the turbine blades.

It will be seen that neither end of the shaft 13 is available for over- and under-speed control or alarm mechanism or an auxiliary generator, and accordingly a short length of the shaft 13 between the main generator 11 and the mechanism 14 carries an auxiliary generator 15 having a permanent magnet rotor 16 mounted on the shaft 13 and a wound armature stator 17 positioned around the rotor 16. The stator 17 is carried in a journal bearing 18 formed on the end of the stator of the main generator 11 and is in consequence capable of movement relatively to the stator of the main generator 11 about the axis of the shaft 13. The stator is held in the bearing by means of plates 19 secured to bosses 21 by means of bolts 22.

A tension spring 23 acts between a pin 24 held on the stator of the main generator 11 and a stop-bar 25 fixed to the stator of the auxiliary generator 15. When the rotor is stationary the stop-bar 25 is held by the spring 23 against a stop pin 26 mounted on the stator of the main generator 11, as shown dotted in Figure 1.

The stator 17 of the auxiliary generator 15 is wound with two windings, one of which is connected to terminals 27 to provide a supply for auxiliary equipment, for example a governor motor, through flexible connectors. The other winding incorporates a resistive dummy load 28 or is connected to such a load, to produce a load torque on the auxiliary generator between its rotor 16 and stator 17, which torque varies with the speed of the rotor and thus with the speed of the main generator 11.

It will be seen that the stator 17 tends to rotate against the restraint of the spring 23 by an amount dependent upon the speed of the main generator 11. It is associated with under-speed and over-speed switches to be operated as a result of such movement.

The underspeed switch comprises a bell crank 31 which for speeds above a desired speed is in the position shown in Figure 1 in which a pair of contacts 32, one of which is carried by the bell crank 31, are open. If the stator 17 is rotated clockwise as shown in Figure 1 by the spring due to a fall in the main generator speed, the stopbar 25 strikes the other arm of the bell crank 31 and rocks the bell crank to close the contacts 32. When the speed rises again so that the stator moves anti-clockwise the bell crank 31 is rocked once again to the position shown in Figure 1. The contacts 32 are incorporated in an underspeed alarm or control circuit.

The overspeed switch is constituted by a cam 34 carried on the stator 17 and a cooperating switch arm 35 pivotally mounted on the bearing 18 fixed to the stator of the main generator 11. Movement of the stator 17 against the spring 23 due to too high a speed will cause the switch arm 35 to rotate clockwise as shown in Figure 2 to close its contacts which are included in an overspeed alarm or control circuit.

The dummy load 28 may be adjustable in order to vary the characteristics of the speed control mechanism so that the switches can be arranged to operate at given speeds.

It will be seen that the arrangement described has the advantage that the length of the complete generating equipment can be kept short since the supports for the auxiliary stator, its restraining devices and speed switches may all be positioned around the outer circumference of the auxiliary generator so as not to encroach on axial space other than that which would in any event be required for an auxiliary generator supplying the governor motor.

What I claim as my invention and desire to secure by Letters Patent is:

1. Electric generating plant which comprises a main generator whose rotor is mounted on a shaft having two ends one of which is driven and the other of which is coupled to a further rotary device, an auxiliary generator having a rotor mounted on the main generator shaft coaxially therewith between its ends and a stator coaxially surrounding the main shaft between its ends, the auxiliary generator having output terminals for delivering an auxiliary electric supply, and the stator of the auxiliary generator being pivotally mounted for angular movement relatively to the stator of the main generator about the axis of the shaft in response to the load torque between the stator and rotor of the auxiliary generator, and resilient restraining means acting on the stator of the auxiliary generator and tending to resist its relative angular movement in the direction corresponding to the load torque and to move it in the opposite direction, under-speed and over-speed protective means associated with the main generator, and operating means mounted between the ends of the main shaft and actuated in response to the said relative angular movement of the auxiliary stator, the said operating means when so actuated operating the under-speed and over-speed protective means.

2. Electric generating plant which comprises a main generator having a rotor mounted on a shaft, the shaft having two ends one of which is driven and the other of which is coupled to a further rotary device, an auxiliary generator having a rotor mounted coaxially on the main generator shaft between its ends and a stator coaxially surrounding the main shaft between its ends, a resistive dummy load connected to the auxiliary generator to be supplied thereby, the stator of the auxiliary generator being pivotally mounted for angular movement relatively to the stator of the main generator about the axis of the shaft in response to the load torque between the stator and rotor of the auxiliary generator, resilient restraining means acting on the stator of the auxiliary generator and tending to turn it in the opposite angular direction to that of the load torque acting on it, under-speed and over-speed switch contacts mounted between the ends of the shaft and operatively connected respectively to under-speed and over-speed protective means associated with the main generator, and operating mechanism mounted between the ends of the shaft and actuated in response to the relative angular movement of the auxiliary stator in either direction, the operating mechanism when so actuated operating respectively the under-speed and the over-speed switch contacts.

3. Electric generating plant as claimed in claim 2 in which the stator of the auxiliary generator comprises a wound armature electrically connected to the dummy resistive load to supply the latter, and in which the said stator also affords auxiliary output terminals for delivering an auxiliary electric supply.

4. Electric generating plant as claimed in claim 3 in which the stator of the auxiliary generator has two windings, one of which is connected to the dummy resistive load and the other of which is connected to the auxiliary output terminals.

5. Electric generating plant as claimed in claim 4 in which the rotor of the auxiliary generator comprises a permanent magnet field.

6. Electric generating plant as claimed in claim 2 in which the restraining means comprises a spring acting between the stator of the auxiliary generator and the stator of the main generator.

7. Electric generating plant as claimed in claim 2 in which the operating mechanism for operating the under-speed and over-speed contacts comprises a first actuating member and a first moving switch member, one of which is carried by the stator of the auxiliary generator and the other of which is carried by the casing of the main generator, the first actuating member engaging the first switch moving member to actuate the under-speed contacts when the auxiliary stator is turned by the resilient restraining means to an extreme position in the direction opposite to that of the load torque, and a second actuating member and a second moving switch member one of which is carried by the auxiliary generator stator and the other of which is carried by the casing of the main generator, the second actuating member engaging the second switch moving member to actuate the over-speed contacts when the stator of the auxiliary generator is turned by the load torque to an extreme position in the direction corresponding to the load torque.

8. Electric generating plant as claimed in claim 2 in which the dummy load is built into and rotates with the stator of the auxiliary generator.

References Cited in the file of this patent

FOREIGN PATENTS

| | | |
|---|---|---|
| 672,637 | Great Britain | May 21, 1952 |
| 714,430 | Great Britain | Aug. 25, 1954 |
| 761,961 | Germany | Mar. 23, 1953 |